Figure 1:
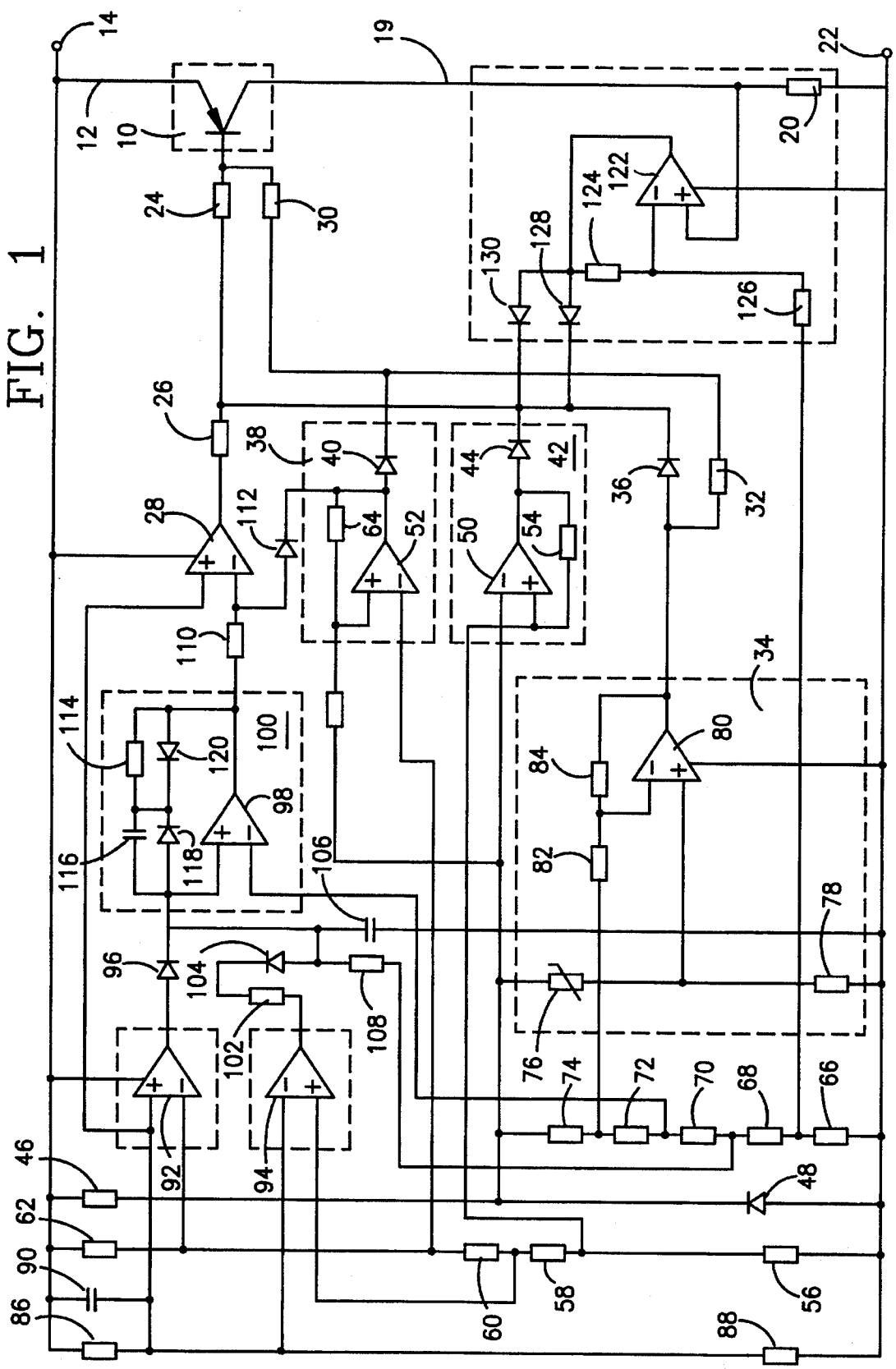

United States Patent [19]

Braun

[11] Patent Number: 5,508,126
[45] Date of Patent: Apr. 16, 1996

[54] DEVICE FOR IMPROVING THE CURRENT OUTPUT OF A CHARGEABLE BATTERY AT LOW OUTSIDE TEMPERATURES

[76] Inventor: Dieter Braun, Grunewaldstrasse 10, 12165 Berlin, Germany

[21] Appl. No.: 244,895

[22] PCT Filed: Dec. 17, 1992

[86] PCT No.: PCT/EP92/02930

§ 371 Date: Jun. 21, 1994

§ 102(e) Date: Jun. 21, 1994

[87] PCT Pub. No.: WO93/13568

PCT Pub. Date: Jul. 8, 1993

[30] Foreign Application Priority Data

Dec. 21, 1991 [DE] Germany .......................... 41 42 628.2

[51] Int. Cl.⁶ .................................................. H01M 10/50
[52] U.S. Cl. ................................ 429/7; 429/62; 429/120; 219/209; 320/35
[58] Field of Search .................................. 429/7, 61, 62, 429/48, 120, 91–93; 320/35, 36; 324/425; 219/201, 209

[56] References Cited

U.S. PATENT DOCUMENTS 4,650,729  3/1987  Nakamura et al. ................... 429/62 X
5,284,719  2/1994  Landau et al. ............................ 429/50
5,290,643  3/1994  Chen ......................................... 429/61
5,362,942  11/1994  Vanderslice, Jr. et al. ........... 429/62 X Primary Examiner—Anthony Skapars
Attorney, Agent, or Firm—Dennison, Meserole, Pollack & Scheiner

[57] ABSTRACT

A battery heating device includes a temperature sensor and at least one heating element in a liquid and acid-proof arrangement inside the battery. The heating element is a power transistor secured to a cooling plate which is powered by the battery, the emitter of the power transistor being powered by a temperature control circuit when the battery temperature falls below a predetermined reference temperature and the battery voltage is higher than a lower threshold and lower than a higher threshold. A trigger circuit responds to a rise in battery voltage after the current in a load having a high current consumption is switched off. The trigger circuit actuates a timer circuit which conductively controls the power transistor for a set time if the battery voltage is under or at the lower threshold.

15 Claims, 5 Drawing Sheets

DEVICE FOR IMPROVING THE CURRENT OUTPUT OF A CHARGEABLE BATTERY AT LOW OUTSIDE TEMPERATURES

The invention relates to a device for improving the current output of a chargeable battery at low outside temperatures for a consumer, wherein a temperature sensor which is disposed fluid-proof and acid-proof in the interior of the battery releases a current flow for at least one heating element if the battery temperature falls below a predetermined set temperature value and the battery voltage is greater than a lower threshold value and less than an upper threshold value.

A device of the type described above is known (DE 90 12 327 U). As a heating element, this device contains a power transistor, which is fastened fluid-proof and acid-proof in the interior of the battery on a cooling element and which is provided with current by the battery during heating. By means of the battery heating device it is intended to maintain the temperature of the chargeable battery at a satisfactory level even at low outside temperatures in order to keep the interior battery resistance of the battery low during high current outputs during start-up of the battery. The thermal output is taken from the battery itself. The battery is discharged over time during extended periods of non-use and low outside temperatures. To prevent too extensive a discharge, the heater is turned off when the battery voltage has reached a lower threshold value, for example 12 Volt. This threshold value is a measure for the remaining charge in the battery. Once the battery has reached its remaining charge and the low outside temperatures continue, the battery becomes colder and takes on the temperature of the outside after some time. Then the battery again has unsatisfactory cold starting properties.

A device for temperature-controlled battery heating by means of a PTC thermistor, which is in good thermal contact with the cell and is electrically parallel connected with it, is disclosed in DE 33 40 882 C1. If the temperature of the cell rises or falls, the PTC thermistor counteracts this by decreasing or increasing its thermal output. The thermal output of the PCT thermistor is adapted by means of its appropriate size, taking the thermal contact surface into consideration.

The invention takes over here and has as its object the development of a device which lends favorable starting properties to a battery even if the battery had been subjected to low outside temperatures over a relatively long time without recharging.

This object is attained in a device of the type described at the outset in that a trigger circuit is provided which reacts to the rise in battery voltage after the current in a consumer with high current consumption has been turned off and actuates a timing circuit which controls the power transistor so it is conducting for a set period of time if the battery voltage lies below the lower threshold value or is equal to it.

After the battery voltage has dropped to the lower threshold value, the battery is still sufficiently charged for providing the heating current for some time and then to provide the current for starting the engine. The above described device detects the voltage condition of the battery and the drop in dynamic voltage caused by turning on the ignition or a strong consumer (cigarette lighter). Turning off the consumer activates the heater for a defined period of time via the trailing edge of the voltage change and places the battery into the optimum operational state again. The heater is turned off during the starting process itself. In case of an unsuccessful engine start the battery continues to be heated during the remaining time interval. This process can be repeated as often as desired.

The above mentioned object is furthermore attained with a device of the type described at the outset in that the temperature sensor controls the connection of the battery with a device which delivers a charging voltage for the battery and which is charged by means of the battery during a period of time when there is no recharging. With this device the properties of the battery for delivering a strong current at low outside temperatures are improved by a charging current. The charging voltage was previously obtained from the battery voltage by means of an appropriate circuit by means of which the battery voltage is increased. The charging current causes a certain warming because of the interior resistance of the battery, however, the operating properties at low outside temperatures are improved in the first place not by the warming, but by the effects of the charging current on the interior resistance. The above described "reverse charging" of the battery is to be recommended for traction batteries, i.e. batteries used for driving motors which directly drive vehicles or machines.

In case the batteries are to be heated for improving the operational properties during low outside temperatures, it is practical to dispose a heating foil in the respective battery, which is heated when current passes through it. In particular, a power transistor, disposed fluid-proof and acid-proof in the interior of the battery and fastened on a cooling element can be provided as the heating element, the control electrode of which can be triggered by a temperature control circuit.

It is particularly advantageous if the heating element is oscillatingly switched on and off, wherein the oscillations of the current in respect to frequency and length are adapted to the size and type of the respective battery. As already mentioned above, when being charged the battery itself is also considered to be a heating element. Sulfatizing of the plates of the battery, which reduces output, can be prevented more easily by the change between current drain and current-free states and the temperature changes connected therewith than by even heating. The current drain cycles, the reverse charging voltage and thus the reverse charging current are also adapted to the respective battery type and battery size for improving the operational properties during draining of a strong battery current and at low temperatures. By means of this it is possible to prevent undesirably strong degassing in some types of batteries. The oscillating current flow through the battery can also be employed at higher temperatures in order to improve the properties. In that case it is not necessary to heat the battery. Thus, the oscillating current drain for improving the battery properties represents an independent invention which has advantageous effects not only at low outside temperatures.

The period of time is preferably approximately fifteen minutes. This time is sufficient to heat the battery to a temperature value favorable for starting, even at outside temperatures of approximately −20° C. In one embodiment of the invention, the timing circuit actuates an indicator element during the period of time. The indicator element makes it possible to see whether the battery is being heated. It is possible to wait until the end of the heating time before turning on the starter of the engine again. In this way it is possible to prevent an unnecessary strain on the battery.

In a preferred embodiment of the invention the gate electrode of the power transistor is connected to the temperature control circuit via two series-connected resistors and to a differential amplifier connected downstream of the timing circuit via two further series-connected resistors. In addition devices for monitoring the lower and upper threshold values are connected via diodes to the common connection point of the two resistors connected to the temperature control circuit. The temperature control circuit is connected via a diode to the common connection point of the resistors fed by the differential amplifier.

With this circuit the effect of the temperature control circuit on the power transistor is blocked by the device for monitoring the threshold values when the threshold values are exceeded in either direction. The timing circuit controls the power transistor to be conducting even if the battery voltage has fallen below the lower threshold value. A trigger circuit, provided in a further embodiment of the invention, which reacts to the drop of the battery voltage when a load with high current consumption is switched on and is set to the timing device. By means of this device the heater is turned off during the starting operation, for example. The energy of the battery is completely available for the starting process in this way.

In a further embodiment of the invention, a measuring resistor is disposed in series with the power transistor and is a component of the threshold value discriminator, the output of which is connected via the diodes to the respective common connection points of the series-connected resistors. An overload protection is achieved with this device.

In a further preferred embodiment of the invention first lines which extend to the heating element or the temperature sensor have connectors of lead at the upper edges of the wall. The components of the temperature control circuit, the devices for monitoring the threshold value, the trigger circuits and the timing circuit are disposed fluid-proof and acid-proof in the lid of the battery. The second lines extending to the temperature sensor and the heating device are provided with connectors of lead at least at the ends which are welded together with the connectors of the first lines. This device assures a fluid-proof and acid-proof sealing of the battery and a fluid-proof and acid-proof enclosure for the lines.

For charging the battery in discharge-free time periods, in another embodiment the battery is connected with an oscillating circuit which transforms the battery voltage into a higher voltage, downstream of which at least one energy reservoir is connected which can be charged with the higher voltage and to which the battery is connected, depending on the temperature measured by the temperature sensor and the battery voltage. The oscillating circuit generates a charging voltage adapted to a favorable charging current strength for the respective battery type and the battery size.

For reverse charging of the battery, accordance with another advantageous embodiment, the respective battery is connected by means of switching elements to at least two energy reservoirs which are charged in parallel to the battery voltage, and which are connected to the battery in series by means of switching elements, depending on the temperature measured by the temperature sensors and the battery voltage. In installations with a series of batteries, such as are used in solar installations, for example, the batteries can also be connected to each other by means of appropriate switching elements in such a way that the batteries alternatingly receive charging currents from other batteries.

Capacitors with great capacitances or batteries, for example nickel-cadmium or lithium batteries, are suitable storage media for the charging voltages.

An improvement of the operating properties of a battery at low temperatures, in particular in respect to delivery of strong currents, can be achieved by thermal insulation of the battery. In this way the batteries do not cool down as rapidly, i.e. the advantageous properties for delivering strong currents remain for an extended time after the charging phase. If heating or reverse charging is performed with these thermally insulated batteries, the heat transfer to the surroundings is considerably less than with customary batteries, i.e. a higher temperature is more rapidly attained. Because of this it is possible to attain a higher temperature in the battery with a lesser amount of energy.

In yet another aspect of the invention, a container for several batteries has walls, at least a first one of which contains wall segments spaced apart from each other, which are hollow and subjected to overpressure and extend over the entire thickness of the wall, wherein respectively one portion of the spaces starting at a wall exterior between the wall segments is filled with further hollow second wall segments subjected to overpressure, which are connected with the first wall segments, and wherein a different part of the spaces between the first wall segments is closed off by a wall which bridges the first wall segments on their ends at the inside of the wall and is subjected to underpressure. The wall is, for example can be embodied in the shape of a dome or a barrel and surrounds the group of batteries in the manner of a roof. In this case the cross sections of the wall segments are adapted in the way of building blocks to the shape of the wall or roof and are rectangular or trapezoidal, for example.

It is also possible to form the wall in the manner of a semicircular vault. The wall segments which are under overpressure are fixedly connected with each other so that a self-supporting structure is formed which is suitable for large battery units, such as can be used with solar generators, for example.

In this device, which has an independent inventive aspect, the foil is sucked into the spaces between the wall segments for a short distance by means of underpressure and strongly rests against them. A good thermal insulating property is already achieved with a low pressure in the spaces. In addition to the large thermal transfer resistance achieved by the thermal insulation of the battery, it is possible to use light-permeable materials for the walls, the foil and the battery housings. Light entering the cells of the batteries from the outside causes some heating. The interiors of the wall segments are connected with each other by openings, for example, so that overpressure in all wall segments can be generated simultaneously by blowing in air. In this case the wall segments can contain flexible walls.

With another advantageous device, which also has an independent inventive aspect, a container for several batteries has walls, at least one of which contains two identically designed halves disposed respectively on the inside and the outside, which have hollow first wall segments which are subjected to overpressure and are disposed respectively spaced apart, wherein the spaces between the first wall segments respectively starting at an outside of the wall are partially filled between the first wall segments with hollow second wall segments which are subjected to overpressure and are connected with the first wall segments, and wherein foils are pressed against the sides of the first wall segments, which are facing away from the outsides of the wall, by the underpressure in the spaces which are free of wall segments and the first wall segments of the two halves are disposed offset from each other by half the distance of the wall segments and are pressed against the foil of the respectively other half.

This device, which is also suitable for larger battery units, has a very good thermal insulation along with great solidity of the wall. The wall segments of respectively one half may be connected with each other by openings in order to be able to generate overpressure simultaneously in all wall segments. The thermal insulation is all the better, the greater the underpressure in the spaces between the first wall segments is. A housing with a certain amount of stability is created by means of such vacuum/overpressure chamber structures. Because of this it is possible to omit heavy and heat-conducting support elements for the framework of the roof structure to a large extent. The device is suitable for large energy reservoirs, such as are used in solar and wind power plants.

In yet another aspect of the invention, at least one battery is disposed in a housing having a wall with two plates with beads on the inside which are disposed offset from each other on both plates and over which inelastic cables of low thermal conductivity have been stretched, wherein the beads are pressed against the cables by means of an underpressure or vacuum obtaining in the hollow space between the plates. The cords or cables or even a foil assure that the plate distance is maintained when there is underpressure in the hollow space between the plates. The beads or nubs rest against the cords or cables or foils which have low thermal conductivity. A particularly good thermal insulation of the respective battery is achieved because of the low thermal conductivity of the cables, ropes or foils and because of the underpressure in the hollow space. The above described device can also be used with batteries without a heating device or reverse charging device and has an individual inventive character.

In still another aspect of the invention a U-shaped pipe is disposed in each cell of the battery, the bend of which is located on or near the bottom of the cell and has flow-through openings, while the openings of the legs of the pipe are located close to the upper end of the cell, wherein means for generating a flow in or on the pipe are provided. In vehicle batteries, the means for generating the flow may be metal spheres, for example of lead enclosed in Teflon. Instead of the spheres it is also possible to provide a carriage, for example of lead, which is movable in the pipe. When the tube is accelerated, the spheres or the carriage move in the pipe, so that a flow is generated in the pipe which causes blending of the fluid in the cell. For this reason no fluid zones of different acid concentration can form in the cell. The operation of the battery is improved by an electrolyte with a uniform acid concentration.

In batteries which are stationary, iron spheres, which are encapsulated to be acid-proof, are disposed inside the pipe, and coils sealed against fluid are disposed next to each other on the outside of the pipe, which coils can be connected alternatingly in sequence periodically to an operating voltage source. Magnetic fields are formed by the current flow, which cause a movement of the iron balls in a direction which is a function of the sequential activation of the coils. The coils are triggered in the same cycle as the power transistors for battery heating. The openings of the pipe are provided with a valve. It is also possible to dispose the coils outside the cells so that a fluid-sealed design is not necessary.

The above described device is also suitable for batteries without a heating device and/or thermally insulated walls, to assure the uniform property of the electrolyte in the entire battery. For this reason this device also has an individual inventive aspect.

Further details, advantages and characteristics of the invention not only result from the claims and the characteristics ensuing therefrom—individually and/or in combination—but also from the subsequent description of a preferred embodiment illustrated in the drawings.

Figure 2:
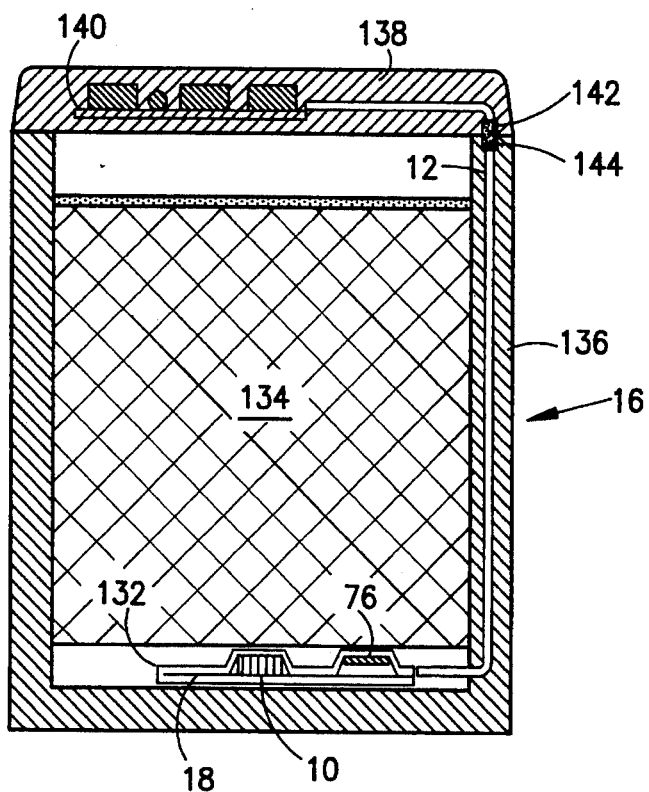
Figure 3:
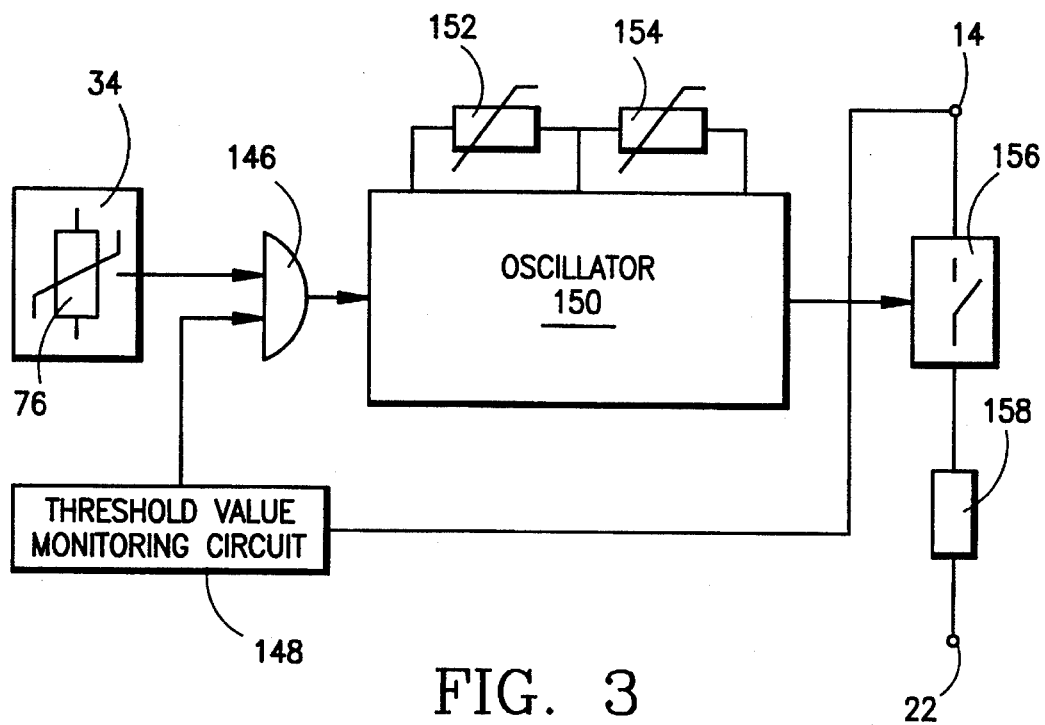
Figure 4:
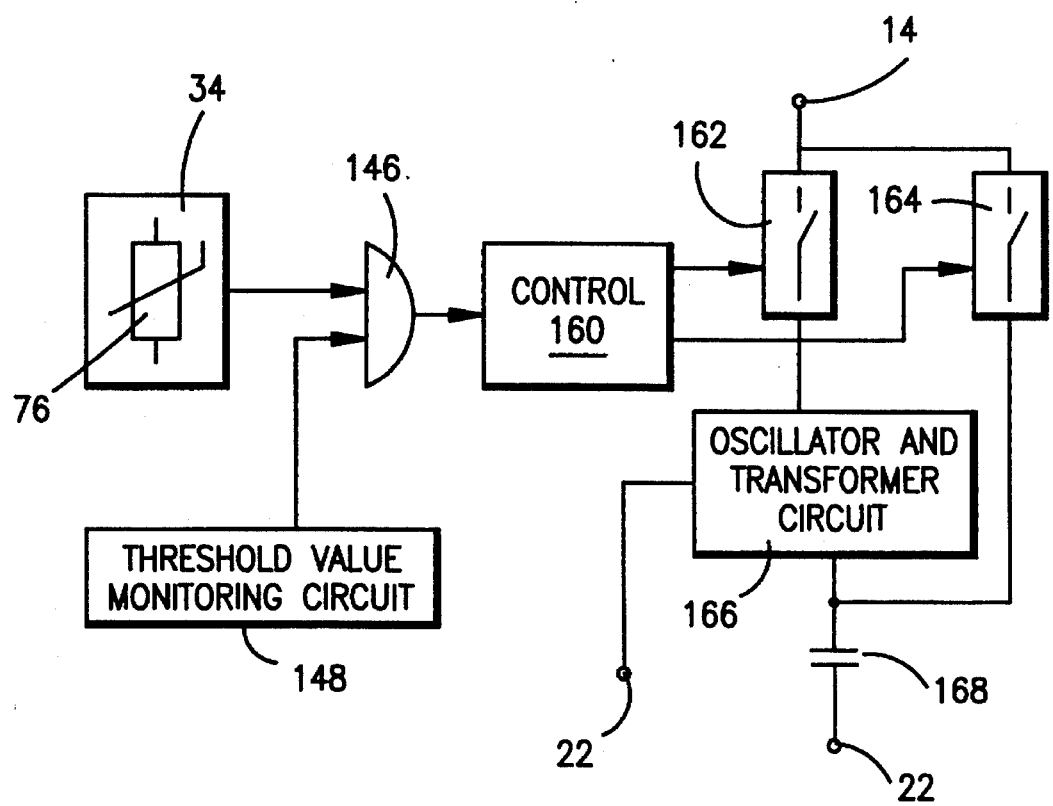
Figure 5:
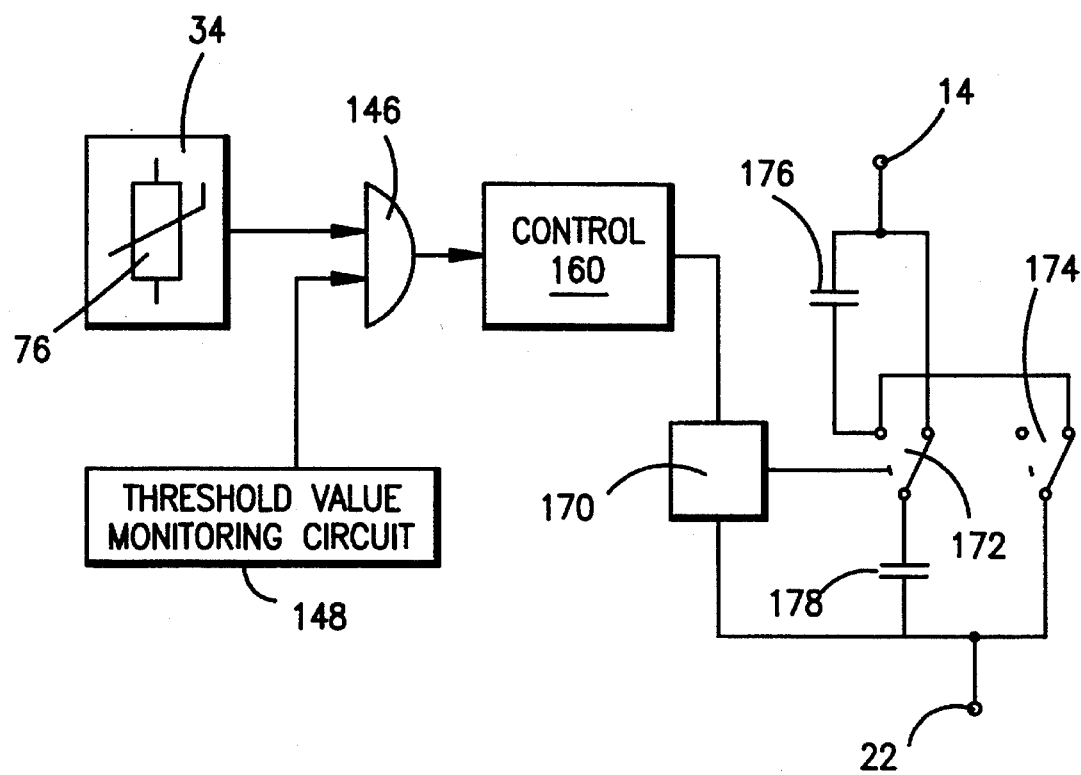
Figure 6A:
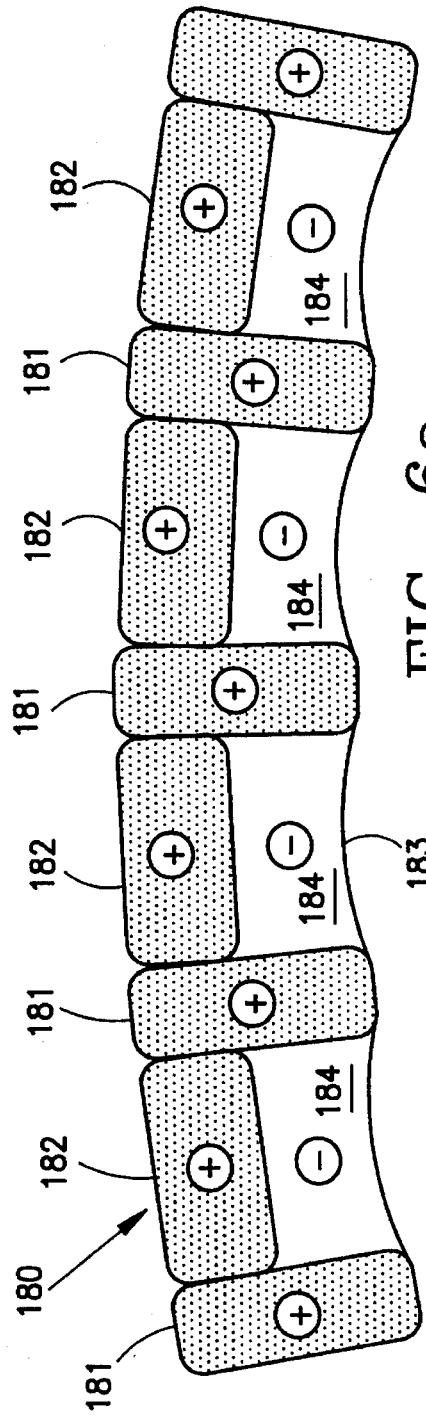
Figure 6B:
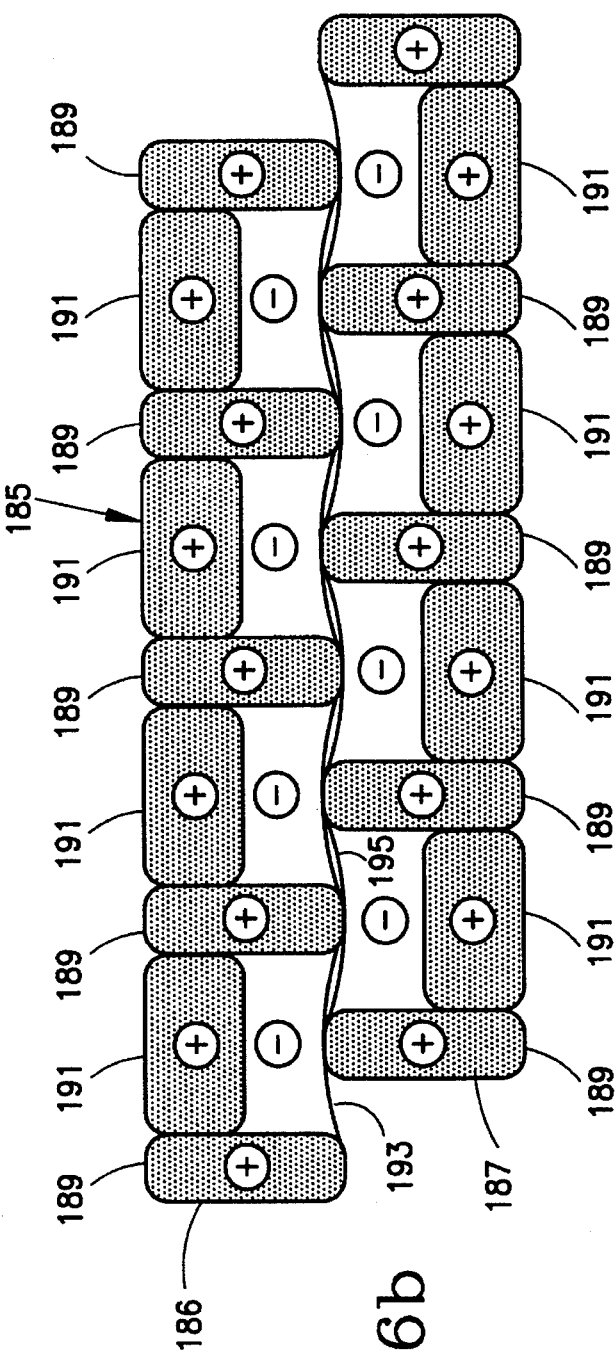
Figure 7:
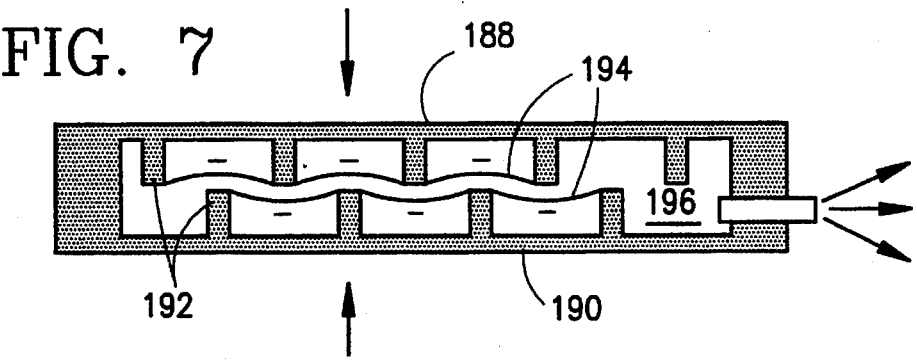
Figure 8:
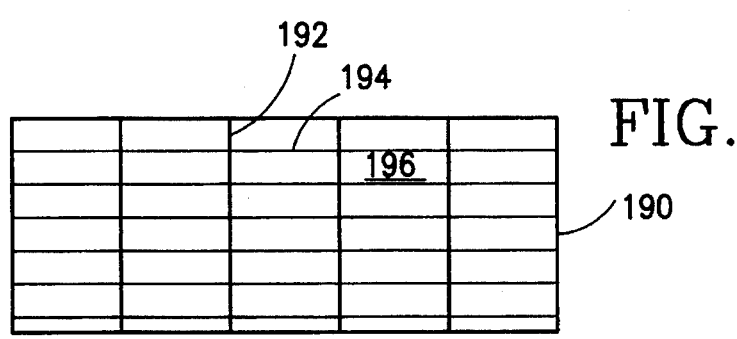
Figure 9:
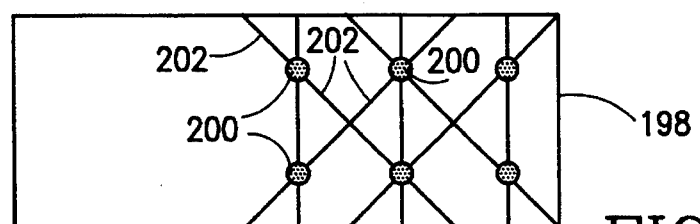
Figure 10:
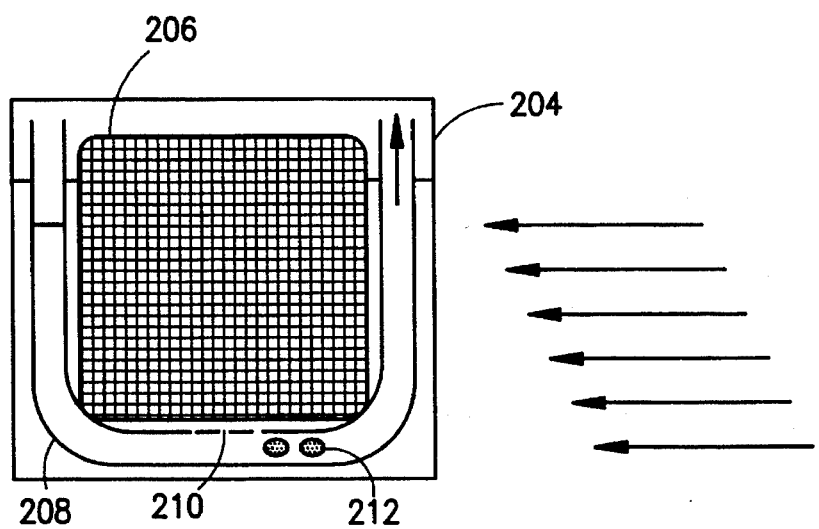

Shown are in:

FIG. 1, a circuit diagram of a battery heating device,

FIG. 2, a battery housing with lid and inserted thermal element in longitudinal section, FIG. 3, a circuit diagram of a device for generating an oscillating current in a heating element, FIG. 4, a circuit diagram of a device for generating a reverse charging current in a battery, FIG. 5, a circuit diagram of another device for generating a reverse charging current in a battery, FIG. 6a, a wall for batteries in longitudinal section, FIG. 6b, another embodiment of a wall for batteries in longitudinal section, FIG. 7, another embodiment of a wall for batteries in longitudinal section, FIG. 8, the wall illustrated in FIG. 7 in a section along the lines I—I, FIG. 9, a further embodiment of a wall for batteries in section, and FIG. 10, a battery cell in cross section.

A battery heating device contains a bipolar power transistor (10) as the thermal element and will also be called a transistor (10) hereinbelow. The emitter of the transistor, for example a pnp-type, is connected via a line (12) to the positive pole (14) of a chargeable battery (16). The transistor (10) is fastened on a cooling element (18), for example a sheet metal piece. The collector of the transistor (10) is connected via a line (19) in series with a measuring resistor (20) to the negative pole (22) of the battery (16). The base of the transistor is connected via two series-connected resistors (24), (26) with the output of a first differential amplifier (28), which receives its operating voltage from the battery (16). The base of the transistor (10) is connected via two further series-connected resistors (30) and (32) to the output of a temperature control circuit (34). The output of the temperature control circuit (34) is furthermore connected via a diode (36) to the common connection point of the two resistors (24) and (26). The diode (36) has its anode connected to the output of the temperature control circuit (34).

A device (38) for monitoring the battery voltage for a lower threshold value, for example 12 Volt, has a diode (40), the cathode of which is connected to the common connection point of the two resistors (30), (32). Another device (42) for monitoring the battery voltage for an upper threshold value, for example 13.75 Volt, has a diode (44) which is connected to the common connection point of the resistors (30), (32).

A Zener diode (48), series-connected with a resistor (46) to the poles (14) and (16) provides a stabilized voltage for the inverting input of a differential amplifier (50) in the device (42) and the non-inverting input of a differential amplifier (52) in the device (38). The differential amplifier (50) feeds the diode (44) and contains a feedback resistor (54) in the direction toward the non-inverting input, which furthermore taps a voltage between two resistors (56), (58) disposed in series. The resistors (56), (58) are series-connected with two further resistors (60) and (62) to the poles (14), (22). At the common connection point of the resistors (60) and (62), a voltage for the inverting input of the differential amplifier (52) is tapped, the output of which is fed back via a resistor (64) to the non-inverting input. Five resistors (66), (68), (70), (72) and (74) are connected in series with each other and in with parallel the Zener diode (48).

The resistors (66) to (74) form one half of a bridge circuit, the other half of which consists of the series connection of a thermistor (76), for example an NTC resistor, and a resistor (78). A line runs from the common connection point of the thermistor (76) and the resistor (78) to the non-inverting input of a differential amplifier (80) of the temperature control circuit (34).

The inverting input of the differential amplifier (80) is connected via a resistor (82) with the common connection point of the resistors (72), (74). The differential amplifier (80), which contains a feed-back resistor (84), feeds the resistor (32) and the diode (36).

A potential divider consisting of two resistors (86), (88) is connected to the poles (14), (22). A capacitor (90) is placed parallel to the resistor (86). The tap of the potential divider consisting of the resistors (86), (88) is connected on the one side to the non-inverting input of a differential amplifier (92) and on the other side to the inverting input of a differential amplifier (94). The inverting input of the differential amplifier (92) is connected to the common connection point of the resistors (60), (62). The non-inverting input of the differential amplifier (94) is connected to the common connection point of the resistors (58), (60). The non-inverting input of the differential amplifier (28) is connected with the non-inverting input of the differential amplifier (92).

The output of the differential amplifier (92) is connected via a diode (96) with the non-inverting input of a differential amplifier (98) in a timer circuit (100). The cathode of the diode (96) is connected to the non-inverting input.

The differential amplifier (94) is a part of a trigger circuit which reacts to the rising voltage edge following a voltage break of the battery voltage.

On the output side, the differential amplifier (94) is connected via a resistor (102) to the cathode of a diode (104), the anode of which is connected with the non-inverting input of the differential amplifier (98), a capacitor (106) and a resistor (108). The capacitor (106) is furthermore connected with the pole (22). The resistor (108) is connected to the tap between the resistors (68), (70).

The inverting input of the differential amplifier (98) is connected with the tap between the resistors (70), (72). The output of the differential amplifier (98) is connected via a resistor (110) with the inverting input of the differential amplifier (28) and with the anode of a diode (112), the cathode of which is connected to the output of the differential amplifier (52).

A series connection consisting of a resistor (114) and a capacitor (116) connects the output of the differential amplifier (98) with the non-inverting input. Two diodes (118), (120) are disposed with opposite polarity in series between the non-inverting input and the output of the differential amplifier (98). The cathodes of the diodes (118), (120) which are connected with each other are connected to the common connection point of the capacitor (116) and the resistor (114).

Within a threshold value discrimination circuit, the non-inverting input of a further differential amplifier (122) is connected with the measuring resistor (20). The output of the differential amplifier (122) is connected via a feed-back resistor (124) with the inverting input, which is furthermore connected via a resistor (126) to the common connection point of the resistors (66), (68). Two diodes (128), (130), one of which is connected to the common connection point of the resistors (24), (26) and the other to the common connection point of the resistors (30), (32), are connected with the output of the differential amplifier (122).

The transistor (10) on the cooling element (18) and the temperature (76) are disposed fluid-proof and acid-proof in a foil (132) in the battery (16) below plates (134). The lines (12), (19) and the lines, not shown in detail, to the base of the transistor (10) and the temperature (76) extend in grooves or bores in at least one wall (136) of the battery (16) and are enclosed fluid-proof by welding in the wall.

FIG. 2 shows the battery (16) in longitudinal section. The lines (12), (19) and the remaining lines to the foil (132) are insulated.

In addition to the transistor (10) and the thermistor (76), the remaining components of the circuit shown in FIG. 1 are disposed on a printed circuit board (140) in the lid (138) of the battery (16) and sealed against fluid.

First lines, not further indicated, extend between the lid (138) and the wall from the poles (14), (22) to the printed circuit board (140), as well as second lines which start from the printed circuit board (140). Connections (142) of lead are provided on the underside of the lid (138) where it rests on the wall (136). Connections (144) of the ends of the second lines are respectively placed opposite the connections (142). When welding the lid (138) to the battery box, respectively the two connections (142) and (144) inside the plastic are simultaneously welded together. A fluid-proof and acid-proof connection of the lines and connections is achieved in this way.

If the thermistor (76) measures too low a temperature, for example below 15° C., the inputs of the differential amplifier (80) are charged with a voltage difference and it emits a low voltage at its output, for example the potential of the pole (22). Because of this the transistor (10) receives a base current via the two resistors (30), (32) and becomes conducting. A current flows in the transistor (10) which generates heat which is discharged to the battery (16).

When the temperature of the battery lies above 15° C., the differential amplifier (80) emits a high potential, for example the potential of the pole (14), which blocks the transistor (10) via the resistor (24) or the resistors (30), (32).

When the battery voltage lies above the lower threshold value, a low potential is present at the output of the differential amplifier (52), which corresponds to the potential of the pole (22), so that the diode (40) operates in the blocking direction. The transistor (10) can then be supplied with base current by the temperature control circuit (34) when the battery temperature falls below the selected set value.

The differential amplifier (50) emits a low potential at its output when the battery voltage is lower than the upper threshold value. Because of this the diode (44) is operated in the blocking direction so that, with a correspondingly low battery temperature, the temperature control circuit can supply the transistor (10) with base current. When the battery voltage lies below or above the respective threshold values, the differential amplifiers (52) and (50) charge the diodes (40), (44) with respectively high potentials in the flow-through direction, which reach the basis of the transistor (10) via the resistor (30) and block it, independently of the output signal of the differential amplifier (80).

If the voltage drop at the measuring resistor (20) is smaller than the voltage tapped at the resistor (66), the differential amplifier (122) provides a low potential, for example that of the pole (22), so that the diodes (128), (130) operate in the blocking direction. If the voltage at the measuring resistor (20) exceeds the voltage at the resistor (66), the discriminator consisting of the resistor (20), the resistors (66) and (126) and the differential amplifier (122) changes into another stable state, wherein the output has a high potential, for example the potential of the pole (14), and switches the transistor (10) to be non-conducting.

When the battery voltage has constant values, the output of the differential amplifier (98) emits a low potential, for example the potential of the pole (22), which is less than the potential present at the non-inverting input of the differential amplifier (28). The differential amplifier (28) therefore generates an output signal with a high potential, for example the potential of the pole (14), which switches the transistor (10) to be non-conducting. A potential which is lower than the potential at the inverting input is present at the non-inverting input of the differential amplifier (98). The differential amplifier (94) emits a high potential at its output.

With constant battery voltage, a low potential is present at the output of the differential amplifier (92) because of the divider condition of the voltage dividers connected with the inputs, namely the potential corresponding to the pole (22). If, at a battery voltage which has reached the lower threshold value or fallen below it, a strong consumer is turned on, for example the starter of the engine, the battery voltage drops and rises again when the current in the consumer is interrupted, for example if it is turned off. The switching status of the differential amplifier (92) which is wired as a comparator is reversed with the edge of the increasing voltage because of the voltage jump at the capacitor (90).

The differential amplifier (92) briefly—i.e. as a function of the time constant of the circuit containing the capacitor (90) and the resistor (86)—has a high output potential corresponding to the potential of the pole (14). By means of this the timer element (100) is triggered, in which the differential amplifier (98) is caused to change its switching state via the high potential fed in by the diode (96).

The switching state of the differential amplifier (28) wired as a comparator is changed via the occurring high output potential of the differential amplifier (98), so that a low potential is applied to the resistor (26). Because of this a base current can flow in the transistor (10), by means of which the transistor (10) is switched to become conducting. After the voltage jump at the capacitor (90) has died out, the differential amplifier (92) returns into its original switching state. The capacitor (116) can discharge in this switching state. After the discharge the differential amplifier (98) again changes its switching state, by means of which the transistor (10) is switched to become non-conducting via the differential amplifier (28).

The discharge time constant is adapted to the length of heating and ensures a heating time of approximately 15 minutes in particular.

The diode (112) prevents the heater from being switched on for the preset length of time when the battery voltage lies above the lower threshold value, because in that case the temperature control circuit switches the transistor (10) on in accordance with the requirements of the temperature set value, which is determined by the resistors of the bridge circuit.

Together with the voltage dividers at its input, the differential amplifier (92) forms a comparator of the trigger circuit, triggers the timer circuit as function of the rear edge of a voltage break of the battery voltage.

An indicator element, for example a light-emitting diode, can be connected to the differential amplifier (98) to indicate the operation of the heater, so that further activation of the starter can be avoided until the end of the heating period shown by the light-emitting diode.

If nevertheless a consumer drawing strong current is switched on during the heating period, the differential amplifier (94) reacts to the trailing edge of the battery voltage and changes its switched state, wherein the output has a low potential, for example that of the pole (22). By means of this the diode (104) is switched to be conducting. In the process, the non-inverted input of the differential amplifier (98) is connected to a low potential, so that the differential amplifier (98) changes its switching state. This means that the transistor (10) is switched to be non-conducting.

The differential amplifier (94) and the resistors of the voltage dividers connected with its inputs form a trigger circuit which turns the heater off if a strong current consumer, for example the starter, is switched on.

The heating device of the invention can be used for traction batteries in particular. In this case the heater can operate until an optimal operating state of the battery has been achieved.

Two heating elements are preferably provided for a battery with six cells, which are disposed in the second and fifth cell. In this way an optimal temperature distribution inside the battery is achieved.

The position fixation of the lines takes place in the areas between the separating walls of the individual cells and the lid connected with them in particular by butt welding (softening of the areas of the lid and the separating walls which later rest on each other). For this purpose cuts, such as notches in the upper rims of the separating walls, can be provided in order to preposition the lines. It should also be mentioned that it is of course possible to provide more than one transistor per heating element for appropriate heat requirements.

A wiring diagram of a device for heating a heating element disposed fluid-proof and acid-proof in a battery is illustrated in FIG. 3. This device also contains a thermistor (76), the same as the heating device represented in FIG. 1, which is disposed in a bridge circuit. The bridge circuit is connected to a temperature control circuit (34), the output of which has been connected with a gate circuit (146). A threshold value monitoring circuit (148) is connected with one of the poles (14) of the battery (16) and emits a signal when the battery voltage is greater than a lower threshold value and less than an upper threshold value. The output of the threshold value monitoring circuit (148) is connected with a second input of the gate circuit (146), which can be an AND-element.

The output of the gate circuit (146) is connected to an oscillator (150), which generates in particular a rectangular pulse sequence, the frequency as well as the pulse pause and pulse length conditions of which can be set. Trimming potentiometers (152), (154), for example, are provided for setting. The output of the oscillator (150) is connected with a switch (156), which may be a contactless switch or a relay. A transistor, for example, is used as a contactless switch, the control electrode of which is connected with the output of the oscillator (150).

The switch (156) is arranged in series with a heating element, a heating foil (158), between the poles (14), (22) of the battery (16). The heating foil (158) is arranged fluid-proof and acid-proof in the battery (16). With the device in accordance with FIG. 3, the battery is heated, depending on the temperature detected by the thermistor (76), by the heating foil (158) in such a way that an optimal synchronous (coherent) oscillation of current consumption and heating output results for the respective battery type (starter, traction, solar batteries et al.) and the respective battery size. This type of heating of the battery particularly prevents the output-reducing sulfating of the plates of the cells.

A device which, besides the generation of a certain heating output to the battery, also has additional effects which improve the cold-starting properties, is shown in FIG. 4. The device in accordance with FIG. 4, the same as the devices represented in FIG. 1 and FIG. 3, contains a temperature sensor embodied as a thermistor, which is disposed in a bridge circuit corresponding to that shown in FIG. 1. The bridge circuit is connected with a temperature control circuit (34), which is represented in detail in FIG. 1 and in FIG. 4 has been designated by (34).

In the same way as the device in accordance with FIG. 3, the device in accordance with FIG. 4 contains a threshold value monitoring circuit (148), which is connected with a gate circuit (146), the same as the temperature control circuit (34), the output of which is connected with a control (160) which controls two switches (162), (164) as a function of the battery temperature and the output signal of the threshold value monitoring circuit (148), which may be contactless switches or relays. The same as the oscillator (150) of FIG. 3, the control (160) determines whether a consumer has been connected to the battery.

The check can be performed in the manner described above in connection with the device in accordance with FIG. 1. If an appropriate outside temperature is present and the battery voltage lies within the limits set in the threshold value monitoring circuit, the switches are alternatingly turned on and off. The switch (162) is disposed in series with an oscillator and transformer circuit (166) between the poles (14) and (22) of the battery (16). One output of the oscillator and transformer circuit (166 is connected with an energy reservoir (168). The switch (164) is disposed between the pole (14) and the energy reservoir (168) parallel with the switch (162) and the oscillator and transformer circuit (166), which hereinafter will be called oscillator circuit for short. At low outside temperatures the control (160) briefly closes the switch (162), because of which the oscillator circuit at the output feeds a voltage which lies above the battery voltage to the energy reservoir (168). The energy reservoir (168) is disposed between the output of the oscillator circuit and the pole (22).

The output voltage of the oscillator circuit has been selected to be high enough to be suitable as a charging voltage for the battery. After charging of the energy reservoir (168), the control (160) opens the switch (162) and closes the switch (164). Because of this the energy reservoir (168) releases a charging current to battery. Thus, the battery is "reverse charged". The control (160) contains a multivibrator which generates the voltage for the switches (162), (164). In addition to this "reverse charging", the charging current also causes a certain heat generation in the battery, wherein both effects improve the starting properties at low outside temperatures.

In traction batteries in particular it is possible to omit heating completely in order to achieve greater ranges in the area of normal temperatures. It is recommended here to "reverse charge" the batteries cyclically. Frequency, charge current, reverse charge current and reverse charge voltage should be appropriately adapted to the battery type.

Modern battery concepts in particular, such as aluminum-air batteries, can become economically practical because of this (for example reduction of extreme gassing).

Depending on battery size and type, it is possible to employ capacitors of large capacity (gold caps) or Nicad and lithium batteries as reservoir media.

FIG. 5 illustrates a device, wherein the bridge circuit, the temperature control circuit (34), the thermistor as the temperature sensor in the battery, the threshold value monitoring circuit (148) and the gate circuit (146) are present in the same manner as in the device represented in FIG. 4.

The control (160) is also present in the same way as in the device in accordance with FIG. 4. In the device illustrated in FIG. 5, only one output signal of the control (160) is used, which supplies a relay (170). The relay (170) has a change-over contact (172) and at least one static current contact (174). A first energy reservoir (176) is disposed between the pole (14) and an input of the change-over contact (172) and its output is connected on the one side to a second energy reservoir (178) and to the static current contact (174). A second input of the change-over contact (172) is connected to the pole (14) of the battery. The static current contact (174) and the energy reservoir (178) are furthermore connected with the pole (22) of the battery.

The control (160) is activated once the temperature sensor and the threshold value monitoring circuit (148) have determined that the cold-starting properties of the battery should be improved because of low outside temperatures.

In the normal case, the battery charges the two energy reservoirs (176), (178) up to the battery voltage. The energy reservoirs are components which had already been described above in connection with the device in accordance with FIG. 4. After a defined charging time, the control (160) actuates the relay (170), because of which the two energy reservoirs (176), (178) are connected in series between the poles (14), (22).

An increased voltage is provided the battery by means of the series connection, which drives a charging current through the battery. By means of this the battery is "reverse charged" and heated to a certain extent. The frequency of the change-over and the length of charging and discharging the energy reservoirs (176), (178) is adapted to the kind and the battery type. At least two energy reservoirs are charged sequentially or in parallel with the aid of an appropriate circuit, so that they then allow, connected in series, the reverse charging of the battery with correspondingly added voltages.

With larger battery packs (solar batteries) it is possible to connect the batteries amongst themselves in such a way that alternating discharging and reverse charging is made possible.

In connection with the device described in FIGS. 3 and 4 in particular it is recommended to protect the batteries or battery packs by means of an appropriate vacuum insulation against low temperatures. A simple vacuum tent construction is advantageous for smaller collections of batteries, i.e. smaller battery packs.

A smaller, hemispherical "balloon envelope" is sucked by underpressure far enough under an exterior structure of a larger, rigid, gas-tight and preferably cupola-shaped wall, so that a relatively weak vacuum already results in good insulating values.

By the use of transparent materials, exterior light can be employed for heating. The self-heating of the batteries because of cyclic reverse discharging would be enough for sufficiently high temperatures in most applications.

FIG. 6a shows a vacuum-overpressure construction, wherein a combination of vacuum and overpressure chambers create a solid wall. Because of this it is possible to omit heavy and heat-conducting support elements for the framework of the roof structure to a large extent.

A wall (180), which can be arched over a series of batteries in the shape of a barrel, for example, contains first wall segments (181), which are embodied in the shape of chambers, are hollow in the interior and disposed at a distance from each other. The wall segments (181) have an approximately rectangular cross section. Preferably there is a slightly trapezoidal cross section provided if a barrel-shaped arch is to be formed. Between respectively two wall segments (181) which extend over the entire wall thickness, second wall segments (182) are disposed, which are embodied chamber-like and are hollow in the interior. In the same way as the first wall segments, the second wall segments begin on the exterior of the wall (180), however, they do not extend over the entire wall thickness but only over a part of it, wherein the remaining portion of the space between respectively two wall segments (181) remains free.

In the embodiment shown in FIG. 6a, the second wall segments respectively fill half of the spaces. The second wall segments (182) also have approximately rectangular or slightly trapezoidal cross section and are adapted in the form of building blocks to the shape of the wall. The hollow spaces of the wall segments (181), (182) are subjected to overpressure and are connected with each other. By means of this they form a solid support structure. A gas-tight wall (183) is disposed between the inside ends of the first wall segments (181) and forms underpressure chambers (184) with the walls of the wall segments (181), (182). The over- and underpressure chambers of the wall (180) are identified in FIG. 6a by plus and minus signs. The wall segments (181), (182) can be connected with each other by openings, wherein on the one hand the simultaneous filling with pressure gas and on the other hand an even pressure are achieved. The underpressure chambers (184) can also be connected by openings, so that in these chambers, too, there can be uniform underpressure or vacuum by means of simultaneous evacuation.

FIG. 6b illustrates a wall construction (185) having two uniformly embodied halves, namely an outer half (186) and an inner half (187). Each half (186), (187) contains first wall segments (189) disposed at a distance from each other and hollow on the inside, which have approximately rectangular or trapezoidal cross sections and are subjected to overpressure. Between the first wall segments (189), respectively second wall segments (191) are located which are also hollow, have approximately rectangular or trapezoidal cross sections and are subjected to overpressure. Like the wall segments (189), the wall segments (191) begin at the outside of the wall, but do not extend over half the wall thickness like the wall segments (189), but only over a portion of the wall. A gas-tight foil (193) leans against the ends of the first wall segments (189) located in the wall center. The spaces between the first wall segments (189) not filled by the second wall segments (191) are subjected to underpressure, because of which the foil (193) is pressed against the wall segments (189). In a like manner a gas-tight foil (195) is pressed against the first wall segments of the inner half (187) which is constructed in the same way as the outer half (186).

The wall segments (189), (191) of the two halves (186), (187) are disposed offset from each other by half the distance between two wall segments (189). For this reason the ends of the wall segments (189) disposed in the wall center respectively rest on the foil of the opposite half. The wall segments (189), (191) are fixedly connected with each other. Because of the offset of the two halves (186), (187) in respect to each other, the spaces of the two halves (186), (187) which are subjected to underpressure adjoin each other. The wall segments (189) of the two halves (186), (187) are merely connected with each other by the poorly heat-conducting foils (193), (194).

Therefore the wall construction illustrated in FIG. 6b has particularly good heat insulation properties.

The wall segments (189), (191) of respectively one half can be connected with each other by openings, not shown, so that overpressure can be generated in all chambers simultaneously. Regarding the underpressure or the vacuum this is also true in connection with the underpressure chambers, which are enclosed by the wall segments (189), (191) and the foils (193) or (195).

In FIG. 6b, plus signs have been inserted in the overpressure chambers to indicate overpressure, and minus signs in the underpressure chambers to indicate underpressure. The device of FIG. 6b is suitable as a roof construction for an installation containing a multitude of batteries, wherein the wall segments are adapted to the arched vault in the form of building blocks. The wall materials of the wall sections (191), (189) and of the foils (193), (195) can be light-permeable.

FIGS. 7 and 8 show walls for batteries which respectively have two plates (188), (190), from the insides of which nubs or beads (192) project at regular intervals. The beads (192) of the two plates (188), (190) are offset in respect to each other. A network of tightened cords or cables (194), which are as inelastic as possible and have little heat conductivity, is stretched over the beads (192). Underpressure or a vacuum is generated in the hollow space (196) between the plates (188), (190), because of which the beads (192) rest against the cables (194) which absorb the force exerted by the air pressure on the plates (188), (190), i.e. the cables (192) of plastic keep the two plates (188), (190) apart from each other. In respect to the cables (194), the device shown in FIGS. 7 and 8 therefore acts in the manner of a suspension bridge construction.

FIG. 9 shows one plate (198) of a container wall containing two such plates, which has nubs (200) in place of beads (192), which project at uniform distances from the inside of the plate. Inelastic, heat-insulating cables (202) are stretched over the nubs (200). In place of the cables (194), (202) it is also possible to employ a foil.

The delivery of the strong current required by starters or other consumer at low outside temperatures is improved by a uniform electrolyte blending, which is also advantageous in operations at higher temperatures.

In FIG. 10 a device for obtaining uniform electrolyte blending is shown in cross section in connection with a cell (204) of a battery containing plate-shaped electrodes (206). In the space between the walls of the cell (204) and the electrodes (206) a U-shaped pipe (208) is disposed, the bend of which lies close to the bottom of the cell (204) and has flow-through openings (210) in the form of perforations for the fluid. The openings of the pipe (208) are close to the upper end of the cell (204). Spheres (212), particularly made of lead, are placed in the interior of the pipe (208). The acid-proof spheres (212), which are enclosed in a plastic material (Teflon), are movably housed in the pipe (208).

In place of the spheres (212) it is also possible to provide a lead carriage which ends flush with the pipe (208). The U-shaped pipe (208) is adapted to the exterior wall of the cell (204) or integrated into the wall. Fluid from the direction of the bottom of the cell (204) can enter through the openings (210). The fluid concentration in the bottom area can be higher than in the remaining part of the cell (204), particularly with low temperatures. When the vehicle accelerates, the spheres (212) move and generate turbulence from the bottom toward the top in the pipe (208).

In this way the concentrated acid is pumped from above into the battery with each acceleration of the vehicle along the U-shaped pipe. If required, the upper outlets of the U-shaped pipe can be provided with a valve (flutter or ball).

With batteries stationary employed the same U-shaped pipes are arranged in the cells. The U-shaped pipes are surrounded by coils in their respective bottom areas, which are connected to the operating voltage in a time-sequenced manner and generate magnetic fields. The application of voltage to the coils is controlled in the same cycle as the above heater transistors. Acid-proof encapsulated iron spheres are put in motion in the respective pipe by the magnetic fields, because of which a flow is generated which favors the blending of the electrolyte. If disposed in the interior of the cell, the coils must be enclosed acid-proof. However, the coils can also be disposed outside the cells, for which an acid-proof enclosure is not necessary.

If larger battery installations are disposed in the above described housings it is practical to provide a ventilating device which is put into operation at higher outdoor temperatures. A cooling device which can operate in accordance with the evaporation principle is also possible.

I claim:

1. A device for improving the current output to a load of a chargeable battery at low outside temperatures, comprising:

a temperature sensor disposed fluid-proof and acid-proof in an interior of said battery;

battery heating means for heating the battery;

trigger means for reacting to a rise in voltage of said battery after the current output to said load is turned off if the battery voltage is greater than a lower threshold value and less than an upper threshold value; and timing means triggered by said trigger means for a preselected period of time for controlling said battery heating means for said preselected period of time if said temperature sensor releases a current flow through said battery heating means, wherein said temperature sensor releases said current flow if the temperature of said battery is below a preselected temperature value.

2. The device of claim 1, wherein said battery heating means comprises a heating foil disposed fluid-proof and acid-proof in said battery and containing material capable of electrically conducting and heating up when current flows through it.

3. The device of claim 1, further comprising a temperature control circuit, and wherein said battery heating means comprises a power transistor disposed fluid-proof and acid-proof on a cooling element in an interior of said battery, said power transistor including a gate electrode triggered by said temperature control circuit.

4. The device of claim 3, wherein said gate electrode of said power transistor is connected to said temperature control circuit via first and second series-connected resistors, said first and second series-connected resistors having a common connection point therebetween, said device further comprising a differential amplifier having an input connected to an output of said timing means, said differential amplifier having an output connected to said heating means via third and fourth series-connected resistors, said third and fourth series-connected resistors having a common connection point therebetween, said device further comprising monitoring means for monitoring lower and upper threshold values of battery voltage, said monitoring means being connected via diodes to the common connection point of said first and second series-connected resistors, said temperature control circuit being connected via a further diode to the common connection point of said third and fourth series-connected resistors.

5. The device of claim 4, further comprising first lines extending to at least one of said heating means and said temperature sensor and having connections of lead at upper edges of a wall, wherein said temperature control circuit, said monitoring means, said trigger means and said timing means are disposed fluid-proof and acid-proof in a lid of said battery, said device further comprising second lines extending to said temperature sensor and to said heating means and passing underneath said lid to areas which cover narrow sides of walls, said second lines being provided with connectors of lead at least at ends thereof, said connectors of lead being welded together with connections of said first lines.

6. The device of claim 1, wherein said battery heating means is switched on and off in an oscillatory manner in accordance with the size and type of the battery.

7. The device of claim 1, wherein said preselected period of time is approximately 15 minutes.

8. The device of claim 1, wherein said timing means operates an indicator element during the preselected period of time.

9. The device of claim 1, wherein said trigger means reacts to a drop of battery voltage when a load with high current consumption is switched on and resets said timing means.

10. The device of claim 1, further comprising a threshold value discriminator having a measuring resistor disposed in series with said power transistor, said threshold value discriminator having an output connected via first and second diodes to the common connection point of said first and second series-connected resistors and to the common connection point of said third and fourth series-connected resistors, respectively.

11. A device for improving the current output to a load of a chargeable battery at low outside temperatures, comprising:

a temperature sensor disposed fluid-proof and acid-proof in the interior of said battery;

battery heating means for heating the battery; and charging means for delivering a charging voltage to said battery;

wherein said temperature sensor releases a current flow through said battery heating means if the temperature of said battery is less than a preselected temperature value, and if the voltage of said battery is greater than a lower threshold value and less than an upper threshold value; and wherein said temperature sensor controls the connection of said battery to said charging means, said charging means being charged by said battery during a period of time when there is no charging of said battery by said charging means.

12. The device of claim 11, further comprising oscillating and transformer means for transforming the battery voltage into a higher voltage, and at least one energy reservoir connected to said oscillating and transforming means and in parallel with said battery, said energy reservoir being chargeable to the higher voltage depending on the temperature measured by said temperature sensor and on the battery voltage.

13. The device of claim 12, wherein charging of said energy reservoirs and discharge of said energy reservoirs via the battery are cyclically repeated.

14. The device of claim 11, further comprising at least two energy reservoirs and switch means for connecting the battery selectively in parallel and in series with said at least two energy reservoirs depending on the temperature measured by said temperature sensor and the battery voltage, said at least two energy reservoirs being chargeable in parallel up to the battery voltage.

15. A device for improving the current output to a load of a chargeable battery at low outside temperatures, comprising:

a temperature sensor disposed fluid-proof and acid-proof in an interior of said battery, and battery heating means for heating the battery;

wherein said temperature sensor releases a current flow to said battery heating means if the temperature of said battery is below a preselected temperature value and the voltage of said battery is greater than a lower threshold value and less than an upper threshold value, said device further comprising switch means for oscillatingly switching said battery heating means on and off, said current flow of said temperature sensor being adapted to the size and type of said battery.

* * * * *